United States Patent [19]
Homier et al.

[11] 3,893,730
[45] July 8, 1975

[54] SEAT POSITIONER

[75] Inventors: Robert I. Homier, Farmington; Raymond C. Posh, Livonia, both of Mich.

[73] Assignee: Lear Siegler, Inc., Detroit, Mich.

[22] Filed: Aug. 5, 1974

[21] Appl. No.: 494,687

[52] U.S. Cl. .................. 297/375; 74/531; 188/67; 248/410; 267/131; 403/104; 403/322
[51] Int. Cl. .............................................. B60n 1/06
[58] Field of Search ............ 297/353, 354, 355, 374, 297/375; 248/188.5, 355, 410; 403/104, 109, 322; 188/67; 74/162, 531; 267/131

[56] References Cited
UNITED STATES PATENTS

| | | | |
|---|---|---|---|
| 2,595,240 | 5/1952 | Glick et al. | 297/375 |
| 3,271,071 | 9/1966 | Tabor | 297/375 |
| 3,356,411 | 12/1967 | Homier et al. | 297/374 X |
| 3,383,135 | 5/1968 | Posh | 297/355 |
| 3,419,306 | 12/1968 | Homier et al. | 297/375 |

*Primary Examiner*—Roy D. Frazier
*Assistant Examiner*—William E. Lyddane
*Attorney, Agent, or Firm*—Reising, Ethington & Perry

[57] ABSTRACT

Seat positioning mechanism comprising a pair of elongated members slidably connected for telescopic movement between extended and retracted positions with respect to each other. One of the members carries friction lock means movable between a lock position on frictional engagement with the other member to frictionally restrain the members in any selected position between the extended and retracted positions against relative movement with respect to each other, and an unlock position to permit free relative movement of the members. The friction lock means is interconnected with the other member by locking and biasing means including a return spring and a plunger. The plunger has a base with arm means projecting therefrom, the base extending transversely of the longitudinal axis of the members and engaging the friction lock means on one side thereof, while the arm means extends from the base to the opposite side of the friction lock means. The return spring is connected between the other member and the end of the arm means opposite the base to resiliently urge the members toward the retracted position and the friction lock means toward its locked position.

15 Claims, 7 Drawing Figures

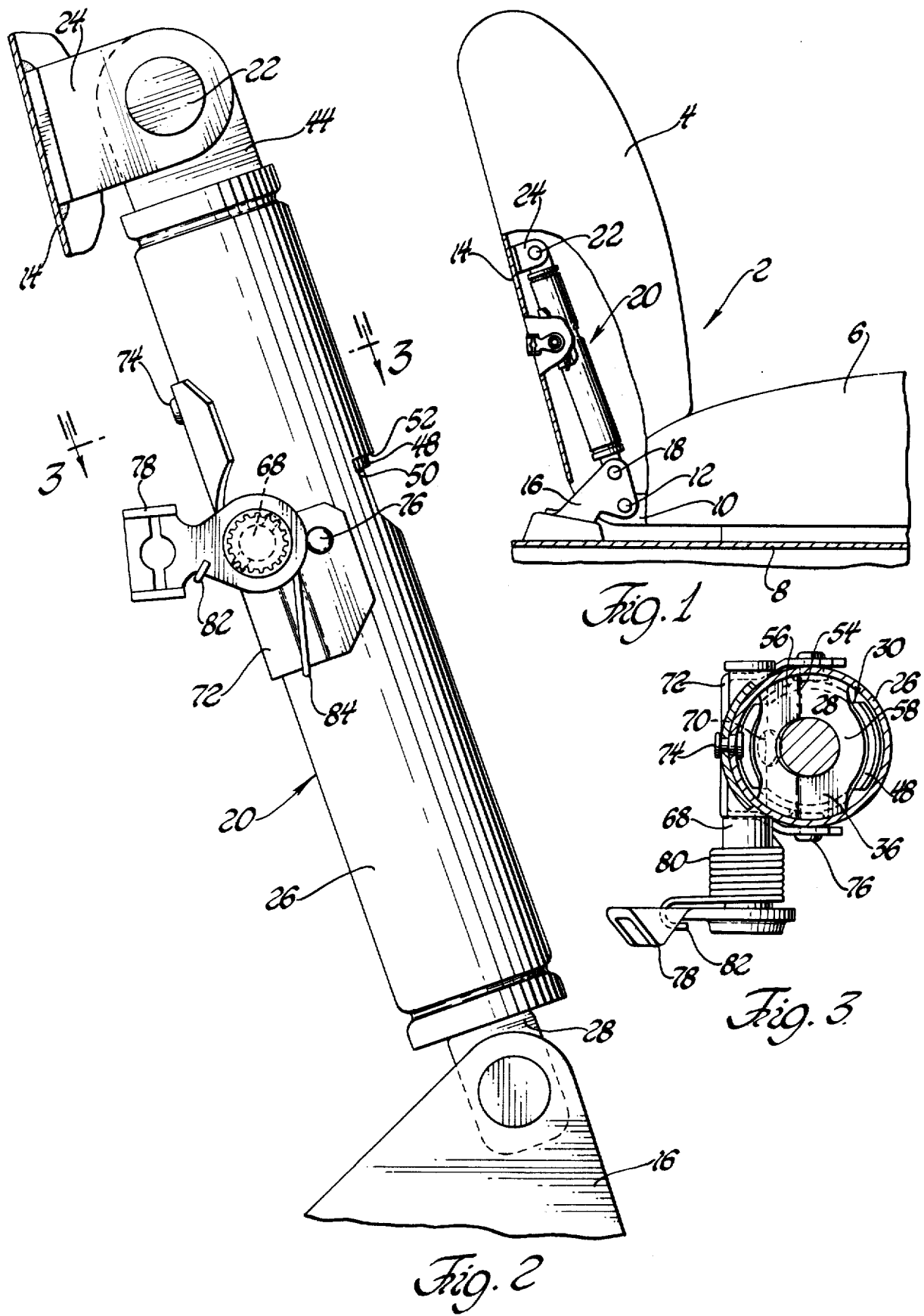

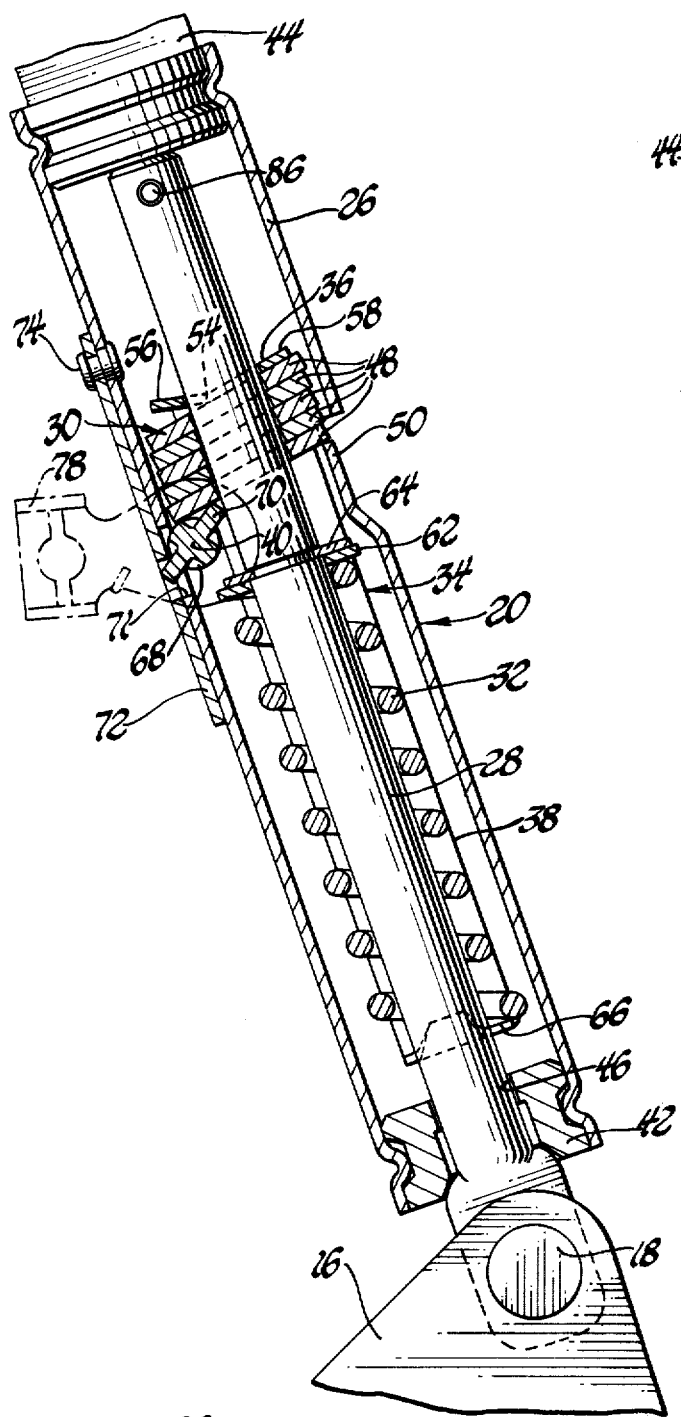
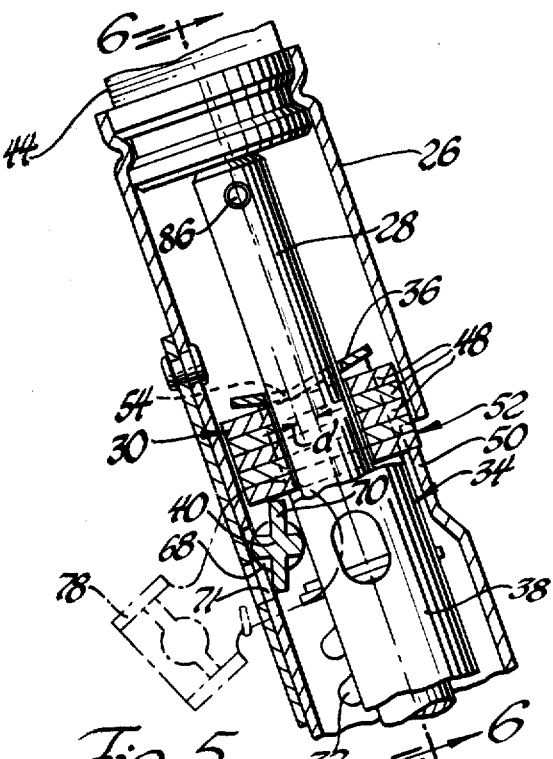
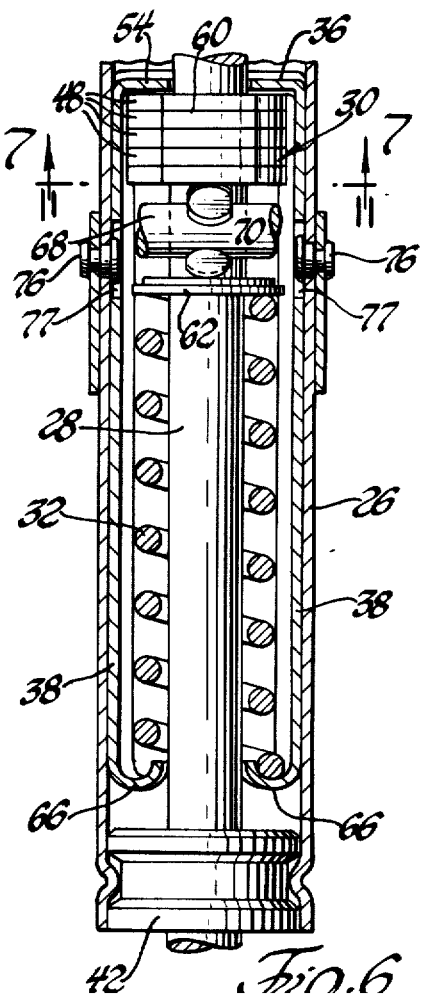
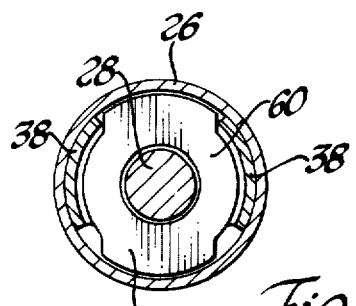

SEAT POSITIONER

BACKGROUND OF THE INVENTION

1. Field of the Invention

This invention relates generally to seat positioning mechanisms, and is particularly concerned with seat positioning mechanisms of the type wherein a pair of members slidably connected for telescopic movement with respect to each other are locked in selected positions with respect to each other by friction lock means.

2. Description of the Prior Art

Examples of positioning mechanisms of the general type with which this invention is concerned are shown in U.S. Pat. Nos. 980,049; 2,595,240; 2,806,723; 3,206,248; 3,271,071; 3,356,411 and 3,419,306.

Mechanisms of this type generally include a pair of elongated members slidably connected for telescopic movement between extended and retracted positions with respect to each other, and one or more friction washers having a lock position in frictional engagement with one of the members to restrain the members against relative movement and an unlock position permitting free relative movement between the members. The friction washers are generally biased to the lock position, and a release cam or the like is selectively operable to move the friction washers to the unlock position against the biasing force. The friction washers engage a fulcrum, and are biased to tilt about the fulcrum to the lock position.

In the prior art mechanisms, the friction washers are generally biased to the locked position by a spring located on the side of the friction washers opposite the fulcrum. In most cases, the friction washers are biased to a tilted, locked position about the fulcrum by a spring separate from the return spring tending to bias the telescopic members to the retracted condition--hence the washers are subjected to the same biasing force in all positions of the telescopic members with respect to each other.

SUMMARY OF THE INVENTION

An object of this invention is to provide a seat positioning mechanism of the general type described in the preceding paragraphs wherein the friction lock means is urged to its locked position by a member engaging the friction lock means on one side and being connected with a spring located on the opposite side of the friction lock means, the spring also serving as a return spring to bias the telescopic members to their retracted positions with respect to each other.

A seat positioning mechanism according to the present invention includes a pair of elongated members slidably connected for telescopic movement between extended and retracted positions with respect to each other. Friction lock means is carried by one of the members, the friction lock means having a lock position in which it is in frictional engagement with the other of the members to frictionally restrain the members in any selected position between the extended and retracted positions against relative movement with respect to each other, and an unlock position to permit free relative movement of the members. Locking and biasing means interconnects the friction lock means and the other member, the locking and biasing means including a return spring and a plunger. The plunger has a base and arm means projecting therefrom, the base extending transversely of the longitudinal axis of the members and engaging the friction lock means on one side thereof. The arm means extends from the base to the opposite side of the friction lock means, and the return spring is connected between the other member and the end of the arm means opposite the base to resiliently urge the members toward the retracted position and the friction lock means toward its lock position.

BRIEF DESCRIPTION OF THE DRAWINGS

FIG. 1 is an elevational view of a vehicle seat having a seat positioning mechanism embodying the invention installed thereon;

FIG. 2 is an enlarged view of the seat positioning mechanism shown in FIG. 1;

FIG. 3 is a sectional view taken on lines 3—3 of FIG. 2;

FIG. 4 is a sectional view of the seat positioning mechanism of FIG. 2 with the parts in a locked condition and restrained against relative movement;

FIG. 5 is a fragmentary view similar to FIG. 4 with the parts shown in an unlocked condition to permit extension of the mechanism;

FIG. 6 is a sectional view taken on lines 6—6 of FIG. 5; and

FIG. 7 is a sectional view taken on lines 7—7 of FIG. 6.

DESCRIPTION OF THE PREFERRED EMBODIMENT

In FIG. 1, reference numeral 2 collectively designates a vehicle seat having a bottom portion 6 and a back portion 4. The seat 2 is mounted on the floor 8 of a vehicle. The bottom portion 6 includes a seat bottom frame 10, and the back portion 4 includes a seat back frame 14. The seat assembly illustrated in FIG. 1 includes a support frame 16 mounted on the floor 8, and the seat back frame 14 and seat bottom frame 10 are hinged together by a pin 12 mounted in the support frame member 16. The back portion 4 is shown in its upright position in FIG. 1, and is pivotally movable in a counterclockwise direction about pin 12 to various selected reclined positions with respect to the bottom portion 6.

The position of the seat back portion 4 with respect to the seat bottom portion 6 is determined by an extensible and retractable seat positioning mechanism indicated collectively by reference numeral 20. One end of the seat positioning mechanism 20 is connected with the support frame 16 by a pin 18, and the other end of the mechanism 20 is connected by a pin 22 to a bracket 24, the bracket 24 in turn being secured to the seat back frame 14. The mechanism 20 is shown in its fully retracted position in FIG. 1, and extends from the retracted position as the seat back portion 4 is reclined in a counterclockwise direction with respect to the seat bottom portion 6.

The seat positioning mechanism 20 includes a pair of elongated members 26 and 28 which are slidably connected for telescopic movement between extended and retracted positions with respect to each other. The mechanism 20 further includes friction lock means 30 (see FIGS. 4 and 5 in particular) carried by member 26, the friction lock means 30 having a lock position shown in FIG. 4 in frictional engagement with the member 28 to frictionally restrain the members 26 and 28 against relative movement with respect to each other, and an unlock position shown in FIG. 5 to permit free relative movement of members 26 and 28.

The friction lock means 30 and member 28 are interconnected by locking and biasing means including a return spring 32 and a plunger 34. The plunger 34 has a base 36 and arm means 38 projecting therefrom. The base 36 extends transversely of the longitudinal axis of members 26 and 28 and engages the friction lock means on one side thereof, the arm means 38 extending from the base 36 to the opposite side of the friction lock means 30. The return spring 32 is connected between member 28 and the end of the arm means 38 opposite the base 36 to resiliently urge the members 26 and 28 toward the retracted position and the friction lock means 30 toward its locked position.

The mechanism 20 further includes release means 40 in the form of a cam mounted on the member 26 for selective movement between an inactive position shown in FIG. 4 permitting the friction lock means 30 to assume the lock position, and an active position shown in FIG. 5 in which the release means 40 holds the friction lock means 30 in the unlocked position against the force of the return spring 32.

The elongated member 26 is in the form of a tubular housing. Mounted in one end of the housing 26 is a bushing 42, and mounted in the other end of the housing 26 is an end fitting 44. The end fitting 44 is secured to the bracket 24 in FIG. 2 by the pin 22. The end fitting 44 and bushing 42 are swaged to the tubular housing 26. Bushing 42 provides an opening 46 for the end of the housing 26.

Member 28 is in the form of an elongated rod slidably supported in the opening 46 of bushing 42. The friction lock means 30 comprises a plurality of lock washers (five in the illustrated embodiment) located in the housing 26. The lock washers 48 have aligned central apertures receiving the rod 28. The lock washers are disposed substantially transversely of the longitudinal axis of the rod in the unlock position as shown in FIG. 5, and are disposed at an acute angle with respect to the longitudinal axis of the rod 28 so that the edges of the central apertures of the washers frictionally engage the rod in the lock position as shown in FIG. 4.

A fulcrum 50 is defined in the housing 26 at a position between the lock washers 48 and the end of the housing in which the bushing 42 is mounted, and the base 36 of the plunger 34 is urged by the return spring 32 to cause the lock washers 48 to tilt about the fulcrum 50 to the lock position. In the illustrated embodiment, the tubular housing 26 is formed with a slot 52, and a portion of the housing is deformed inwardly adjacent the slot 52 to form the fulcrum 50. The washer 48 closest to the open end of the housing has its peripheral edge engaged with the fulcrum 50 as shown in FIGS. 4 and 5.

The base 36 of the plunger 34 is formed with a contact portion 54 that engages the lock washers on the side thereof opposite the fulcrum 50. The contact portion 54 is spaced from the longitudinal axis of the rod 28 a distance d (FIG. 5) on the side of the axis of rod 28 opposite the fulcrum 50. The base 36 is dished to form the contact portion 54 such that a pair of sections 56 and 58 extend in opposite directions at an angle on the contact portion 54 as shown in FIG. 4.

The arm means 38 in the illustrated embodiment is in the form of a pair of arm members extending from the base 36 on opposite sides of the rod 28 in parallel relationship with each other. The arm members 38 extend past the lock washers 48 in the direction of the open end of the housing at bushing 42. As shown in FIG. 7, the washers 48 have reduced diameter portions 60 to provide a clearance for the arm members 38.

A spring seat member 62 is carried by the rod 28 as shown in FIG. 4. The spring seat member 62 is in the form of a washer 62 seated against a retaining ring 64 mounted in a circumferential slot in the rod 28. The ends 66 of the arm members 38 opposite the base 36 are curved inwardly toward each other as shown in FIGS. 4 and 6, and the spring 32 comprises a coil spring surrounding the rod 28 with one end seated on the spring seat member 62 and its other end seated in the curved ends 66 of the arm members 38. Spring 32 is in compression, and urges the rod 28 to retract into the housing 26 toward the fully retracted position illustrated in FIG. 4.

The release cam 40 is formed on a transverse shaft 68 rotatably mounted in the housing 26 on the side of the lock washers 48 opposite the base 36 of the plunger. The release cam 40 is formed with lobes 70 projecting radially from the axis of the transverse shaft 68. As shown in FIGS. 4 and 5, the lobe 70 is engageable with the lock washers 48 on the side of the rod 28 opposite the fulcrum 50 to force the lock washers to the unlock position when the transverse shaft 68 is rotated from the inactive position of FIG. 4 to the active position of FIG. 5.

The tubular housing 26 is formed with a slot 71 (FIGS. 4 and 5) for receiving the shaft 68, and the shaft is supported in the slot 71 by a cap or saddle member 72. The saddle member 72 is secured to the housing 26 by rivets 74 and 76. Clearance slots 77 are provided in the arm members 38 (FIG. 6) for the rivets 76.

An operating handle 78 is mounted on one end of the shaft 68, and a release return spring 80 is mounted on the shaft 68 with one end 82 engaged with the handle 78, and the other end 84 engaged with the saddle member 72 to bias the cam shaft 68, and hence the cam lobe 70 to the inactive position of FIG. 4 in which the lock washers 48 are permitted to assume the lock position.

Mounted in the inner end of the rod 28 (FIGS. 4 and 5) is a transverse stop pin 86. The stop pin 86 is engageable with the base 36 to limit the extension of the rod 28 with respect to the housing 26.

The mechanism 20 is shown in its fully retracted position in FIG. 4, and can be moved to the fully extended position with the stop pin 86 engaged with the base 36 when the locking washers 48 are moved by the cam lobe 70 from the lock position of FIG. 4 to the unlock position of FIG. 5. The return spring 32 is in compression in the fully retracted position of FIG. 4, and is further compressed as the rod 28 extends from the housing 26 and is at its maximum compression when the mechanism 28 is in the fully extended position. When the lock washers 48 are actuated to the unlock position of FIG. 5, the mechanism can be adjusted to any selected position between the fully retracted and fully extended positions, and then locked in the selected position by permitting the lock washers to assume the lock position of FIG. 4.

The back portion 4 of the seat 2 can be reclined from its upright position shown in FIG. 1 by moving the operating handle 78 from the position shown in FIG. 4 to the position shown in FIG. 5 to release the rod 28 from the lock washers 48. The seat can then be reclined in a counterclockwise direction to the desired position defined between the fully extended and fully retracted positions of the mechanism 20. When the seat is in the desired position, the operating handle 78 is released and the return spring 32 causes the lock washer 48 to assume the lock position of FIG. 4 to frictionally restrain the rod 28 against movement with respect to the housing 26 to in turn restrain the seat back 4 against movement from the desired reclined position. The seat back portion 4 can be returned to the upright position either by again moving the operating handle 78 to the FIG. 5 inactive position whereupon the spring 32 will cause the mechanism 20 to retract and return the seat back 4 to its upright position, or the seat can be pushed to the upright position from the rear simply by overcoming the friction lock between the lock washers 48 and rod 28. Thus, a person in the rear seat of a vehicle can push the reclined seat back 4 to the upright position without releasing the friction lock by manipulation of the operating handle 78. The seat can be pushed relatively easily from a reclined position to the upright position by applying pressure near the top of the seat back portion 4. The return spring 32 also assists in returning the seat back to the upright position against the frictional resistance of the washers 48. Furthermore, the more the seat back 4 is reclined, the more the spring 32 will be compressed, and hence, the more the spring 32 will assist in returning the seat back 4 to the upright position. The return spring 32 urges the mechanism 20 toward its retracted position and the friction lock washers 48 toward the lock position with a force that decreases as the retracted position is approached by the members 26 and 28.

While a specific form of the invention is illustrated in the accompanying drawings and described in the foregoing specification, it should be understood that the invention is not limited to the exact construction shown. To the contrary, various alterations in the construction and arrangement of parts, all falling within the scope and spirit of the invention, will be apparent to those skilled in the art.

The embodiments of the present invention in which an exclusive property or privilege is claimed are defined as follows:

1. Seat positioning mechanism comprising: a pair of elongated members slidably connected for telescopic movement between extended and retracted positions with respect to each other; friction lock means carried by one of said members; said friction lock means having a lock position in frictional engagement with the other of said members to frictionally restrain said members in any selected position between said extended and retracted positions against relative movement with respect to each other, and an unlock position to permit free relative movement of said members; and locking and biasing means interconnecting said friction lock means and said other member; said locking and biasing means including a return spring and a plunger; said plunger having a base and arm means projecting therefrom, said base extending transversely of the longitudinal axis of said members and engaging said friction lock means on one side thereof, said arm means extending from said base to the opposite side of said friction lock means, and said return spring being connected between said other member and the end of said arm means opposite said base to resiliently urge said members toward the retracted position and said friction lock means toward its lock position.

2. Mechanism as claimed in claim 1 further including release means mounted on said one member for selective movement between an inactive position permitting said friction lock means to assume the lock position and an active position in which said release means holds said friction lock means in the unlock position against the force of said return spring.

3. Mechanism as claimed in claim 1 wherein said one member comprises an elongated housing having an opening in one end thereof, and said other member comprises a rod slidably supported in said opening.

4. Mechanism as claimed in claim 3 wherein said friction lock means comprises a plurality of lock washers located in said housing, said lock washers having aligned apertures receiving said rod, said lock washers being disposed substantially transversely of the longitudinal axis of said rod in the unlock position and being disposed at an acute angle with respect to the longitudinal axis of said rod such that the edges of the apertures frictionally engage the rod in the lock position.

5. Mechanism as claimed in claim 4 including means defining a fulcrum in said housing at a position between said lock washers and said one end of said housing, said base being urged by said return spring to cause said lock washers to tilt about said fulcrum to the lock position.

6. Mechanism as claimed in claim 4 wherein said base is formed with a contact portion that engages said lock washers on the side thereof opposite said fulcrum.

7. Mechanism as claimed in claim 6 wherein said contact portion is spaced from the longitudinal axis of said rod on the side thereof opposite said fulcrum.

8. Mechanism as claimed in claim 7 wherein said base is dished such that a pair of sections extend in opposite directions at an angle from said contact portion.

9. Mechanism as claimed in claim 6 wherein said arm means comprises a pair of arm members extending from said base on opposite sides of said rod past said lock washers in the direction of said one end of said housing.

10. Mechanism as claimed in claim 9 wherein a spring seat member is carried by said rod and is located on the side of said washers opposite said base, and wherein the ends of said arm members are curved inwardly toward each other, and said spring comprises a coil spring surrounding said rod with one end seated on said spring seat member and its other end seated in the curved ends of said arm members.

11. Mechanism as claimed in claim 10 further including release means mounted on said housing for selective movement between an inactive position permitting said lock washers to assume the lock position and an active position in which said lock washers are held thereby in the unlock position against the force of said return spring.

12. Mechanism as claimed in claim 11 wherein said release means comprises a transverse shaft rotatably mounted in said housing on the side of said lock washers opposite said base, and at least one cam lobe projecting radially from said transverse shaft, said cam lobe being engageable with said lock washers on the side of said rod opposite said fulcrum to force said lock washers to the unlock position when said transverse shaft is rotated from the inactive to active position.

13. Mechanism as claimed in claim 12 further including a release return spring connected between said transverse shaft and housing biasing said transverse shaft to the inactive position.

14. Mechanism as claimed in claim 11 further including a stop pin on said shaft located on the side of said base opposite said lock washers, said stop pin being engageable with said base to limit extension of said rod from said housing.

15. Seat positioning mechanism comprising: a housing having an opening in one end; a rod slidably received in said opening for telescopic movement with respect to said housing between extended and retracted positions; friction lock washer means mounted in said housing; a fulcrum defined in said housing; said friction lock washer means having a lock position tilted about said fulcrum in frictional engagement with said rod to frictionally restrain said rod in any selected position between the retracted and extended positions against movement with respect to said housing, and an unlock position disposed substantially transverse to said rod and out of frictional engagement with said rod to permit free movement of said rod with respect to said housing; rod locking and biasing means interconnecting said friction lock means and said housing; said rod locking and biasing means comprising a return spring and a plunger; said plunger having a base with a central aperture receiving said rod and a pair of arms projecting from said base in parallel relationship on opposite sides of said rod, said base engaging said lock washer means on the side thereof opposite said fulcrum and said arms extending past said lock washer means toward said one end of said housing, said return spring being located in said housing between said one end and said lock washer means, and said return spring having one end engaged with said rod and its other end engaged with said arms and being in compression to urge said rod toward its retracted position and said lock washer means toward the lock position.

* * * * *